United States Patent [19]

Usui

[11] Patent Number: 5,046,765
[45] Date of Patent: Sep. 10, 1991

[54] TUBULAR FITTING FOR CONNECTION OF A BRANCH PIPE

[75] Inventor: Masayoshi Usui, Shizuoka, Japan

[73] Assignee: Usui International Industry Ltd., Shimizu, Japan

[21] Appl. No.: 355,520

[22] Filed: May 23, 1989

[30] Foreign Application Priority Data

May 31, 1988 [JP] Japan .................................. 63-72233
May 31, 1988 [JP] Japan .................................. 63-72234

[51] Int. Cl.⁵ .............................................. F16L 41/00
[52] U.S. Cl. .................................. 285/197; 285/319; 285/156; 285/305
[58] Field of Search .............. 285/156, 197, 305, 319, 285/330, 921, 198, 199

[56] References Cited

U.S. PATENT DOCUMENTS

| | | | |
|---|---|---|---|
| 470,531 | 3/1892 | Aims, Jr. | 285/305 |
| 1,470,485 | 10/1923 | De Rouen | 285/156 X |
| 1,803,576 | 5/1931 | Weatherhead, Jr. | 285/156 X |
| 1,803,577 | 5/1931 | Weatherhead, Jr. | 285/156 X |
| 2,550,591 | 4/1951 | Parsons | 285/319 |
| 3,218,093 | 11/1965 | Carlson | 285/197 |
| 3,292,954 | 12/1966 | Corey | 285/198 |
| 3,538,940 | 11/1970 | Graham | 285/305 X |
| 3,918,748 | 11/1975 | Acola | 285/114 X |
| 3,933,170 | 1/1976 | Olson, Jr. | 285/197 X |
| 4,844,515 | 7/1989 | Field | 285/305 |
| 4,858,964 | 8/1989 | Usui | 285/156 |

Primary Examiner—Dave W. Arola
Assistant Examiner—Jeffrey L. Thompson
Attorney, Agent, or Firm—Schwartz & Weinrieb

[57] ABSTRACT

A tubular fitting used for the connection of pipes, is formed such that if a main pipe and a branch pipe are inserted respectively within a through hole and a branch hole within the main fitting, and are coupled with the main fitting by means of the engaging body being engaged with the branch pipe and the branch pipe being engaged with the main pipe, the main pipe and the branch pipe can be securely connected by mechanical means without having to perform brazing operations.

13 Claims, 6 Drawing Sheets

TUBULAR FITTING FOR CONNECTION OF A BRANCH PIPE

BACKGROUND OF THE INVENTION

1. Field of the Invention

The present invention relates generally to a tubular fitting for connecting a branch pipe incorporated within a conduit system used to convey fluids within various types of mechanical devices such as, for example, automobiles; and more particularly to a tubular fitting which is used for the connection of relatively small pipes.

2. Description of the Prior Art

Fittings for the connection of branch points of pipes or conduits used to convey fluids are known in the prior art, such as, for example, in Japanese Laid-open Utility Model Application No. 56-16453. However previous methods of connection of the branch pipe to the main pipe involved brazing the branch pipe to the fitting body, thus making the work of connection very difficult. Brazing methods also have the disadvantage that the heat applied to localized areas during brazing weakens the mechanical strength of the brazed part, thereby leading to accidental cracking, and making it essential to construct a heat-resistant cover over the entire surface of the product by means of painting or plating the same after, the brazing operation thus requiring more work and manufacturing operations, and hampering of the workability of the device.

SUMMARY OF THE INVENTION

This invention solves the problems outlined above by eliminating all deleterious effects of brazing operations, no brazing of the branch points of pipes used to convey fluids being required.

More specifically, this invention comprises a tubular fitting that is constructed of a fitting body which is provided with a through hole which extends through the body from one end to the other end, the through hole being intersected by and connected to a branch hole. In addition, the fitting has a concave engaging part on the outside of the fitting body forming the branch hole, and an engaging body is constructed of both an engaging hole opening into the main part thereof for the insertion of the branch pipe which is inserted and connected into the branch hole of the fitting body, and an engaging projection with an elastic engaging edge projecting along one side of this main part, the elastic engaging edge fitting into the concave engaging part of the main fitting.

BRIEF DESCRIPTION OF THE DRAWINGS

These and other objects, advantages, features and uses of the present invention will become more apparent as the description proceeds, when considered with the accompanying drawings in which like reference characters designate like or corresponding parts throughout the several views, and wherein.

DESCRIPTION OF THE PREFERRED EMBODIMENTS

Figure 1:
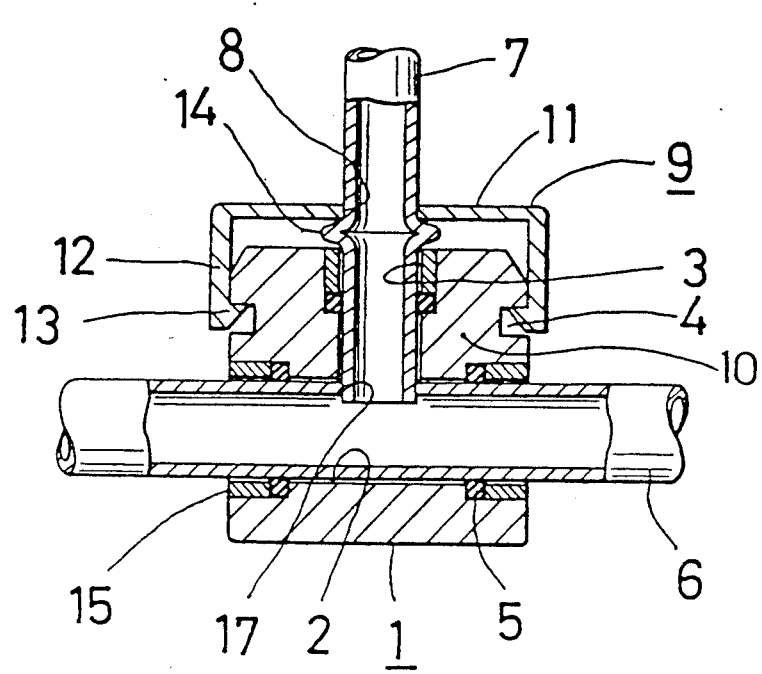
FIG. 1 is a cross-sectional view of a tubular fitting comprising the first embodiment of this invention.
Figure 2:
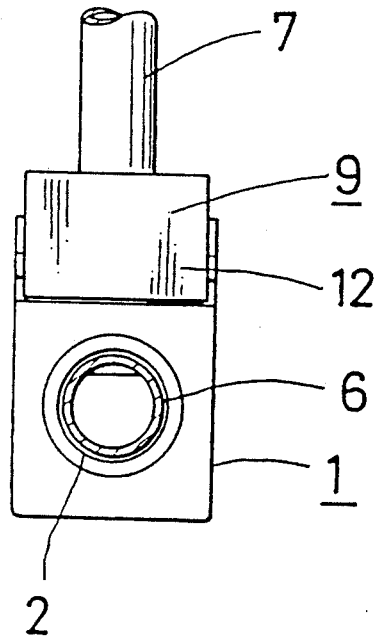
FIG. 2 is a side view of the embodiment shown in FIG. 1.
Figure 3:
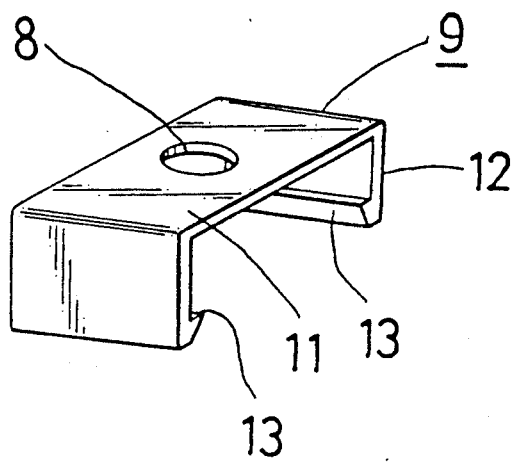
FIG. 3 is a perspective view of the engaging body of the tubular fitting of the first embodiment.

The first embodiment of this invention is illustrated in FIGS. 1 through 3, where (1) is a fitting body, formed of a hard material such as, for example, a suitable metal or a hard plastic, which has a through hole (2) extending therethrough from one end to the other, and also a branch hole (3) which is disposed substantially perpendicular with respect to branch hole (2), with a concave engaging body (4) provided upon the outside of the part (10) forming the branch hole (3). Furthermore, upon the inside of the through hole (2) and the branch hole (3), there is mounted an elastic seal (5) such as, for example, an O-ring, thus constructing a water-tight joint between the main pipe (6) and the branch pipe (7) respectively disposed within the through hole (2) and the branch hole (3).

Furthermore, the main rectangular part (11) of the engaging body (9) has an engaging hole (8) defined within the center portion thereof, into which is inserted the branch pipe (7) which is already inserted within the branch hole (3) of forming part (10). At the same time, an elastic engaging edge or skirt (12) with an appropriate degree of elasticity projects downwardly along opposite sides of the rectangular main part (11) of the engaging body, with an engaging protrusion (13) projecting inwardly from each side so that the lower ends of this elastic engaging edge (12) are disposed within the concave engaging part (4) of the fitting body (1). This elastic engaging edge (12) may be formed by bending both ends of the rectangularly-shaped main part (11), or it may be formed of elastic engaging edges (12), projecting downwardly at appropriate circumferential intervals upon the outside of a circularly-shaped main part (11), as shown in FIG. 6.

The main pipe (6) which projects axially outwardly from either end of the through hole (2) into which it is inserted, has a connection hole (17) on its circumference at a circumferential location thereof into which hole (17) a branch pipe (7) formed separately from the main pipe (6) is inserted. Upon the outside of branch pipe (7), engaging protrusions (14) are constructed so as to project radially outwardly at axial positions beneath the interior surface of the main part (11) of the connecting body (9) and above forming part (10). These engaging protrusions (14) may be formed by crimping the branch pipe (7), or by means of a separate fixed fixture.

Figure 4:
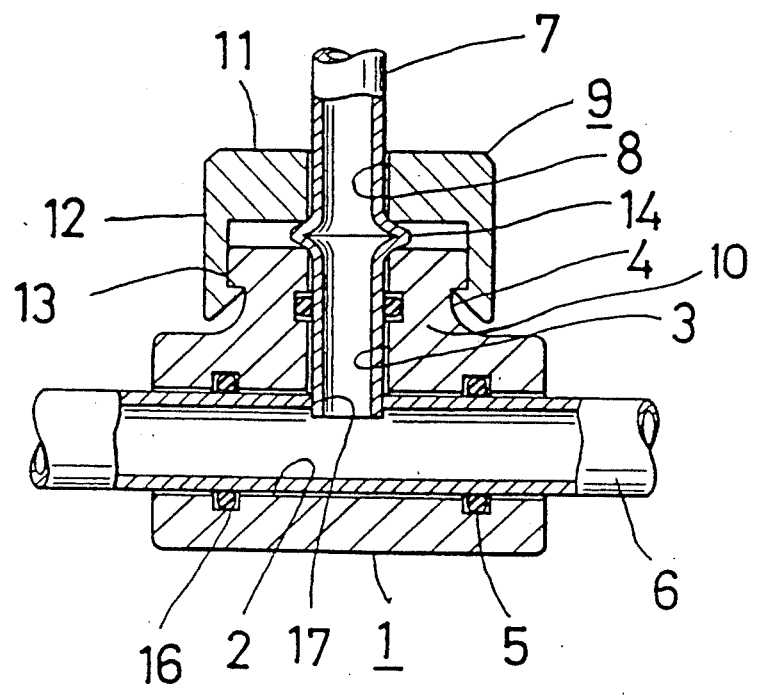
FIG. 4 is a sectional view of a tubular fitting comprising the second embodiment of this invention.

The attachment of the elastic seal part (5) such as, for example, the aforenoted O-ring within the shoulder portions of the through hole (2) and the branch hole (3), may be obtained through means of a bush (15) as shown in FIG. 1, or through means of the construction of a recessed, annular mounting groove (16) for housing of an elastic seal (5) such as, for example, an O-ring as shown in FIG. 4. As an alternative to the use of an elastic seal such as, for example an O-ring, the water-tight disposition of the branch pipe (7) and the main pipe (6) within the through hole (2) and the branch hole (3) may be obtained by using a force fit method to tightly insert the branch pipe (7) and the main pipe (6) within the through hole (2) and the branch hole (3), thus providing such water-tight conditions. Other widely known methods may also be used.

Figure 5:
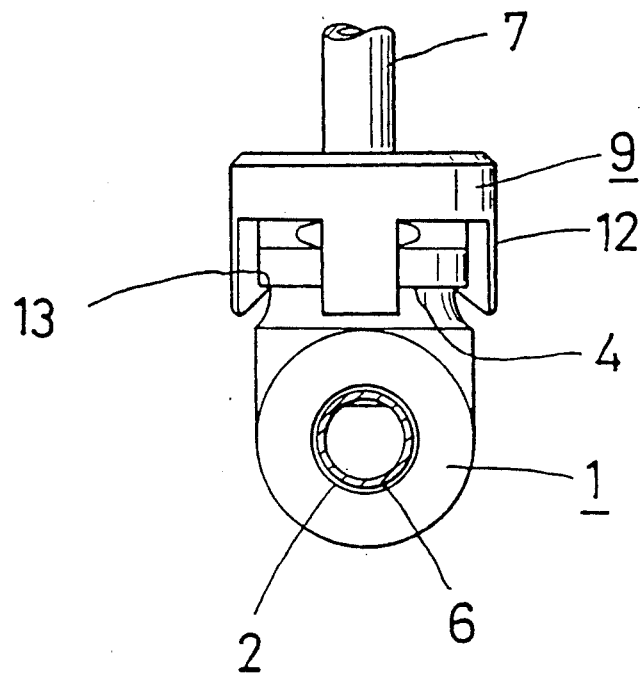
FIG. 5 is a side view of the tubular fitting in FIG. 4.
Figure 6:
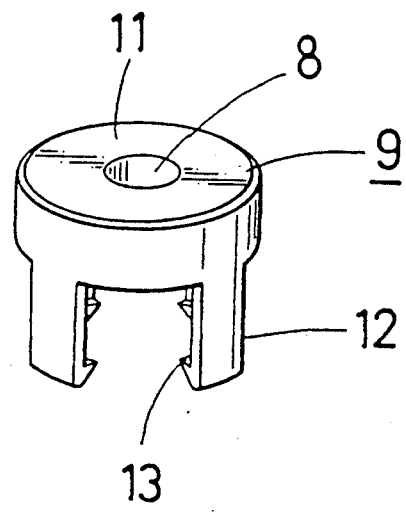
FIG. 6 is a perspective view of the engaging body of the tubular fitting of the second embodiment.

The second embodiment, shown in FIGS. 4 through 6, is almost the same as the first embodiment, and thus common parts have been indicated with the same number and a duplicate description has therefore been omitted.

The tubular fitting described in connection with FIG. 1 to FIG. 6, and constructed as described above, permits a branch pipe to be joined to a main pipe such that it cannot be readily separated from the main fitting, simply by first inserting the main pipe with an open fluid flow hole into the through hole within the fitting body, inserting the branch pipe into the branch hole, and then applying pressure to the engaging body in the direction of the main fitting body or perpendicular to the main pipe, so that the engaging projections on the elastic engaging edges snap-fit engage into the concave engaging parts or grooves 4 defined within body 10. Thus, it is no longer necessary to braze any parts; and furthermore, any deterioration of the mechanical strength or the occurrence of accidental cracking caused by means of the local application of heat during the brazing operation is eliminated, and consequently, painting or plating of the entire product after the brazing operation is no longer required.

Furthermore, if an elastic seal is mounted upon the insides of the through hole and the branch hole, the branch pipe and the main pipe can be inserted into the fitting body in a water-tight manner.

Figure 8:
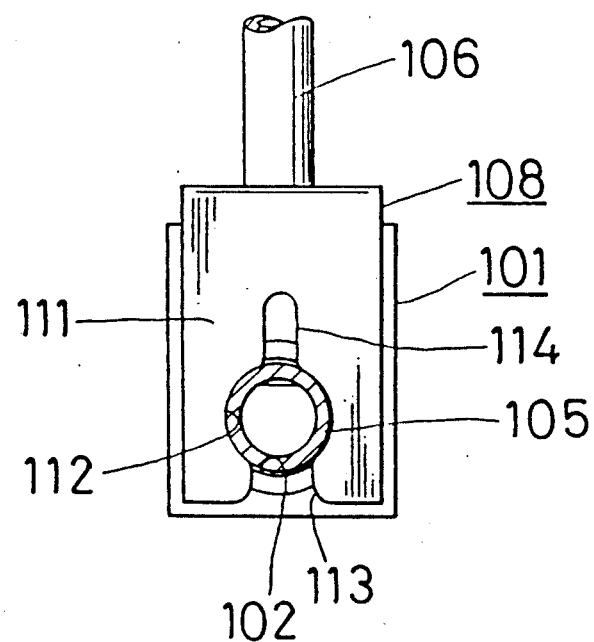
FIG. 8 is a side view of the embodiment shown in FIG. 7.
Figure 9:
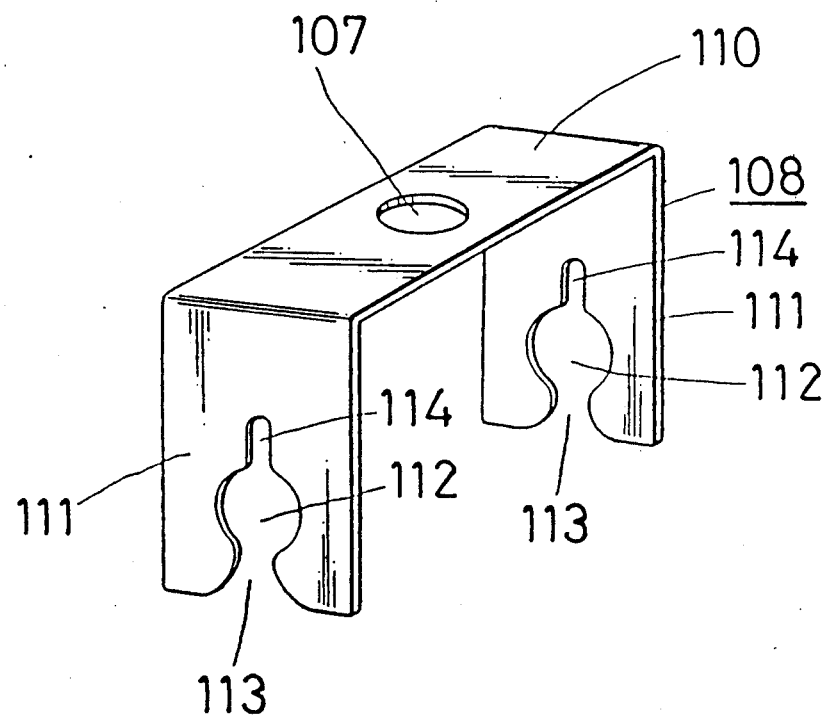
FIG. 9 is a perspective view of the engaging part of the tubular fitting of the third embodiment.

A third embodiment of this invention will now be described in connection with FIGS. 7 through 9, wherein (101) is a fitting body, formed of a hard material such as, for example, a metal or a hard plastic, which has a through hole (102) extending therethrough from one end to the other, and also a branch hole (103) which is formed so as to extend substantially perpendicular to through hole (102), with an elastic seal (104) such as, for example, an O-ring disposed within counterbored shoulder portions of the through hole (102) and the branch hole (103) respectively, thus constructing a water-tight joint between the main pipe (105) and the branch pipe (106) within the through hole (102) and the branch hole (103).

The engaging hole (107) used for the insertion and engagement of the branch pipe (106) which is inserted into the branch hole (103) is defined within the main plate (110) of the engaging body (108), and at the same time a mating hole (112) for engaging the main pipe (105) which is inserted into the through hole (102) is provided upon both flanges (111) which are formed by bending the ends of the main plate (110) downwardly. The mating hole (112) has an opening (113) integrally connected thereto and interposed between the ends of both flanges (111), thereby giving the opening (113) an arcuate shape. An expanding slot (114) is integrally linked to the mating hole (112) at a position diametrically opposite opening (113) for use as a means of expanding the mating hole (112) when the external dimensions of the main pipe (105) are approximately the same as, or bigger than, the mating hole (112).

Figure 7:
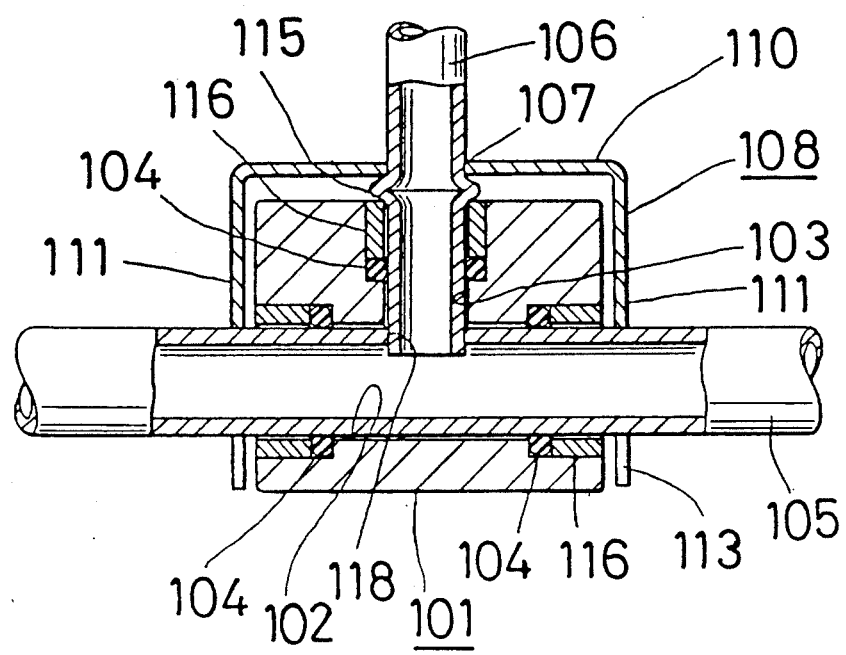
FIG. 7 is a cross-sectional view of a third embodiment of this invention.
Figure 10:
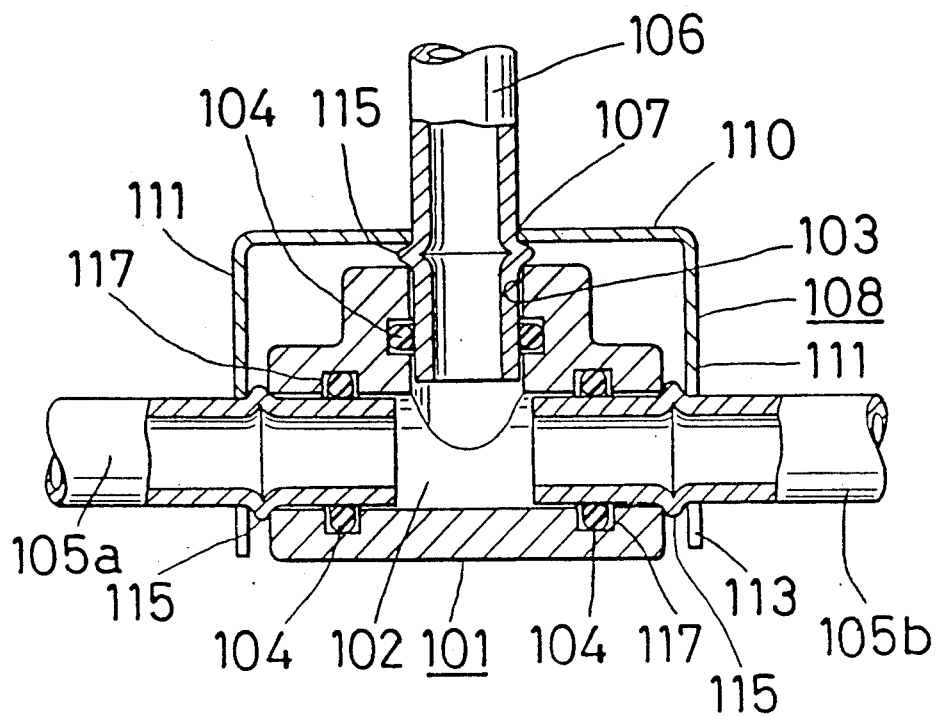
FIG. 10 is a sectional view of a tubular fitting comprising the fourth embodiment of this invention.

The main pipe (105) which projects axially outwardly from both ends of the through hole (102) into which it is inserted, may form one continuous pipe as shown in FIG. 7. At the same time within a circumferential surface portion thereof there is a defined connection hole (118) into which the end of a branch pipe (106) is inserted, it being noted that upon the outside of branch pipe (106), engaging protrusions (115) are constructed so as to project radially outwardly and be interposed between the inside surface of the main plate (110) of the engaging body (108) and fitting body (101). These connection protrusions (115) may be formed by crimping the branch pipe (106), or by means of a separate fixed fixture. Each main pipe (105) respectively disposed upon the right and left sides of the joint, and inserted into and projecting out from both ends of the through hole (102), and the branch pipe (106) inserted into the branch hole (103), may be independently constructed as shown in FIG. 10. In this case, the engaging protrusions (115) are also formed upon the outside of both the main pipe (105)—formed of main pipes (105a) and (105b)—and branch pipe (106), in positions adjacent to the inside of the engaging body (108), so that they engage with engaging body (108) along with fitting body (101).

Furthermore, an O-ring (104) may be disposed at predetermined axial locations and annularly about the inner circumferential surfaces of the through hole (102) and the branch hole (103) so as to provide a water-tight connection between the branch pipe (106) and the main pipe (105). The mounting of the elastic seal part (104) such as, for example, the O-ring annularly about the through hole (102) and the branch hole (103) may be obtained through means of a bush (116) as shown in FIG. 7, or by the provision of a concave or recessed annular groove (117) for the disposition of the elastic seal (104) such as, for example, an O-ring, as shown in FIG. 10.

As an alternative to the use of an elastic seal (104) such as, for example, an O-ring, the water-tight insertion of the branch pipe (106) and the main pipe (105) in the through hole (102) and the branch hole (103) may also be obtained by using a force-fit method so as to tightly insert the branch pipe (106) and the main pipe (105) within the through hole (102) and the branch hole (103).

Figure 11:
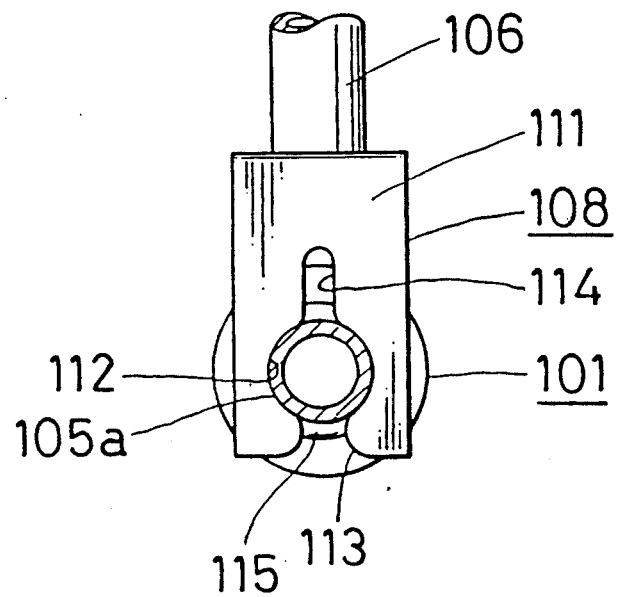
FIG. 11 is a side view of the tubular fitting in FIG. 10.

The fourth embodiment of this invention, shown in FIG. 10 and FIG. 11, is almost the same as the third embodiment shown in FIGS. 7 through 9, and only those parts which are different will be described. Common parts have been indicated with the same number and a duplicate description thereof has been omitted.

The tubular fitting illustrated in FIG. 7-FIG. 11, and constructed as described above, permits a branch pipe to be joined to a main pipe such that they cannot be readily separated from the fitting body, simply by inserting the main pipe and the branch pipe within the through hole of the fitting body and the branch hole of the fitting body, and engaging the engaging body with the main pipe and the branch pipe outside of the fitting body. Thus, not only is it no longer necessary to braze any parts, but any deterioration of mechanical strength or the occurrence of accidents due to cracking caused by means of the local application of heat during a brazing operation is eliminated, and painting or plating of the entire product after the brazing operation is also no longer necessary.

When the main pipe inserted within the through hole is formed continuously as one pipe, the construction of the engaging protrusions upon the outside of the branch pipe and the engagement of such engaging protrusions with the engaging body prevents the detachment of the branch pipe. Where the main pipe and the branch pipe are formed separately, detachment of the main pipe and the branch pipe may be prevented by means of the engagement of the engaging projections projecting outwardly from the outside surfaces of the main pipe and the branch pipe, with the engaging body. Furthermore, if an elastic seal is mounted upon an internal circumferential portion of the through hole and the branch hole, the branch pipe and the main pipe can be inserted within the fitting body in a water-tight manner.

Obviously, many modifications and variations of the present invention are possible in light of the above teachings. It is therefore to be understood that within the scope of the appended claims, the present invention may be practiced otherwise than as specifically described herein.

What is claimed is:

1. A tubular fitting for connection of a branch pipe to a main pipe, comprising:
    a fitting body;
    through hole means defined within said fitting body for housing said main pipe;
    branch hole means defined within said fitting body for housing said branch pipe and intersecting said through hole means so as to provide fluidic communication between said main pipe and said branch pipe; and
    a single-piece engaging means having a first portion thereof engaged directly with said branch pipe, and a second portion thereof engaged with either one of said main pipe, or an external surface of said fitting body, so as to directly envelop said main pipe, or clampingly engage said fitting body, respectively, thereby fixedly maintaining said main pipe and said branch pipe mounted within said fitting body.

2. The tubular fitting for connection of a branch pipe described in claim 1, which is characterized by being constructed with a main pipe which is inserted in the through hole means and which projects from either end of said through hole means having a branch hole means in its casing for the insertion of the end of a separately-constructed branch pipe, which has formed on its outside, in adjacent positions on the inside of the main part of the engaging means, an engaging protrusion.

3. The tubular fitting for connection of a branch pipe described in claim 1 which is characterized by the engaging means comprising a rectangular-shaped member having an elastic engaging edge which is formed by bending both ends of the rectangular-shaped member.

4. The tubular fitting for connection of a branch pipe described in claim 1 which is characterized by being provided with an elastic seal on the internal circumferences of the through hole means and the branch hole means, thus providing a water-tight seal between the branch pipe and the main pipe.

5. The tubular fitting for connection of a branch pipe described in claim 1 which is characterized by having two main pipes, independently constructed, each main pipe which is inserted in the through hole means and which projects from both ends of the through hole means, and a branch pipe which is inserted in the branch hole means; with, on the outside of each main pipe and the branch pipe, a projecting engaging protrusion in a position adjacent to the inside surface of the engaging means.

6. A tubular fitting as set forth in claim 1, wherein:
    said fitting body has engaging groove means defined therein; and
    said engaging means comprises an engaging projection for disposition within said engaging groove means of said fitting body.

7. The tubular fitting for connection of a branch pipe as set forth in claim 6, which is characterized by:
    said engaging means having a substantially circular configuration and having a plurality of engaging projections circumferentially spaced at predetermined intervals for engaging said engaging groove means of said fitting body.

8. The tubular fitting as set forth in claim 6, wherein:
    said engaging means has a substantially rectangular configuration with an engaging projection disposed at each end of said engaging means, and extending toward each other, for disposition within said engaging groove means of said fitting body.

9. A tubular fitting as set forth in claim 1, wherein:
    said engaging means has first hole means defined within said first portion thereof for insertion therethrough of said branch pipe, and second hole means defined within said second portion thereof for insertion therethrough of said main pipe.

10. The tubular fitting for connection of a branch pipe described in claim 9, which is characterized by being constructed of a main pipe which is inserted in the through hole means and which projects from either end of said through hole means, having a branch hole means in said fitting body for the insertion of the end of the branch pipe; and, on the outside of the separately constructed branch pipe, at a position located on the inside surface of the engaging means, an engaging protrusion used for engaging the branch pipe with the engaging means.

11. The tubular fitting for connection of a branch pipe described in claim 9 which is characterized by being provided with an elastic seal on the inside circumferences of the through hole means and the branch hole means this providing a water-tight seal between the branch pipe and the main pipe.

12. A tubular fitting as set forth in claim 9, wherein:
    said second hole means extends from free edge portions of said second portion of said engaging means so as to divide said second portion of said engaging means into expansible portions for accommodating different diametrically sized main pipes.

13. The tubular fitting as set forth in claim 1, wherein:
    said through-hole means defined within said fitting body has an internal diametrical dimension which is slightly greater than the outer diametrical dimension of said main pipe such that said main pipe can be inserted within said through-hole means with a predetermined clearance defined between said through-hole means and said main pipe; and
    said branch hole means defined within said fitting body has an internal diametrical dimension which is slightly greater than the outer diametrical dimension of said branch pipe such that said branch pipe can be inserted within said branch hole means with a predetermined annular clearance defined between said branch hole means and said branch pipe.

* * * * *